Apr. 10, 1923.

J. ROSS 1,451,406

DRIVE WHEEL LOCKING DEVICE

Filed Mar. 14, 1921

Witness
Edward T. Wray

Inventor
James Ross
by Parker & Carter
Attorneys

Patented Apr. 10, 1923.

1,451,406

UNITED STATES PATENT OFFICE.

JAMES ROSS, OF LAPORTE, INDIANA, ASSIGNOR TO ADVANCE RUMELY COMPANY, OF LAPORTE, INDIANA, A CORPORATION OF INDIANA.

DRIVE-WHEEL-LOCKING DEVICE.

Application filed March 14, 1921. Serial No. 452,067.

*To all whom it may concern:*

Be it known that I, JAMES ROSS, a citizen of the United States, residing at Laporte, in the county of Laporte and State of Indiana, have invented a certain new and useful Improvement in Drive-Wheel-Locking Devices, of which the following is a specification.

This invention relates to means for locking the differential in the transmission of an automotive vehicle. As is well known such vehicles are commonly provided with differential gearing whereby the speed of rotation of the driving wheels may be differed. When one of the driving wheels of the automotive vehicle is in contact with a good driving surface, as for example, a road, and the other wheel is in contact with a bad driving surface, as for example, a mud hole, it is common experience that the wheel on the road will not revolve whereas the wheel in the mud hole when power is applied will revolve rapidly without performing any effective work. It is one of the objects of the present invention to provide a means which will prevent this action so that at the will of the operator the differential may be locked and the two driving wheels will revolve in unison and at the same speed. Another object of the invention is to provide in such a lock an automatic means for throwing it out of operation. As soon as the pressure is applied through the gearing member each driving wheel becomes substantially even. Thus as soon as the vehicle has gotten out of the mud hole each of the wheels is exerting the same directive effect so that there is no tendency for one wheel to move at a different speed from the other. The differential lock will automatically be thrown out of operation.

The invention is illustrated more or less diagrammatically in the accompanying drawings, wherein—

Like parts are designated by like characters throughout.

Figure 1:
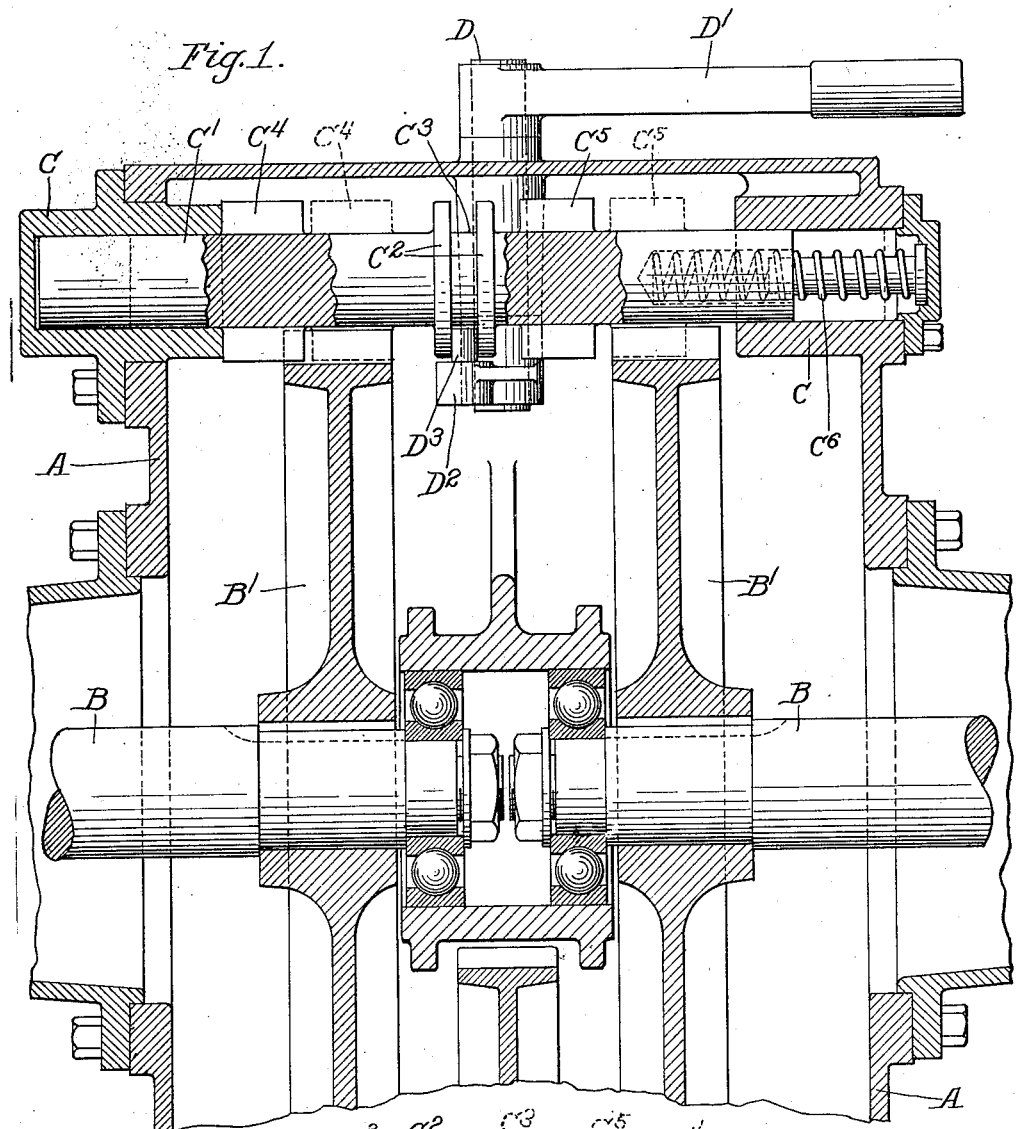
Figure 1 is a section of that part of the driving mechanism to which the lock is applied.
Figure 2:
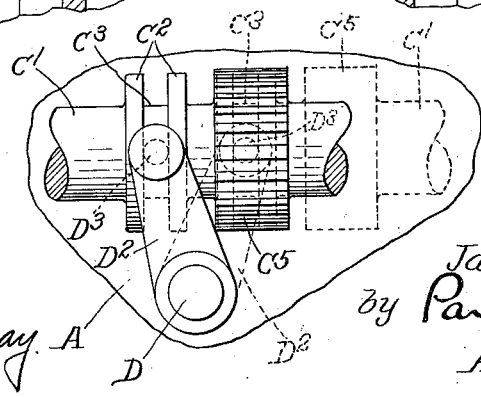
Figure 2 is a detailed plan view of the gear shifting lever with parts omitted.

A is a housing within which the driving and differential gearing is located. B B are stub shafts, each carrying at its outer end the driving wheel and at its inner end a master gear B'. Mounted in the bearings C within the housing A is the stub shaft C' upon which are formed the two flanges $C^2$ so as to leave between them the annular space $C^3$. Mounted upon the shaft C' are the pinions $C^4$ $C^5$ each adapted to mesh with one of the master gears B'. The pinion $C^4$ is normally in slight engagement with, for example, the left master gear B'. The pinion $C^5$ is normally out of mesh and the shaft C' therefore idles with the rotation of the left master gear B'. The parts are normally held in the position shown in Figure 1 by means of the coil spring $C^6$.

When it is desired to lock the parts, the shaft C' is moved laterally so that the pinion $C^5$ engages the right hand master gear B' and the pinion $C^4$ more completely engages the left hand master gear B'. Thus the shaft C' rotates with the rotation of the two master gears and the speed of the master gears is the same, and thus slipping of one wheel while the other stands still is prevented.

As a means of operating the lock the shaft D is mounted in the housing A. It has in its outer end an operating handle D' and in its inner end the crank member $D^2$ which carries a pin $D^3$ adapted to penetrate within the annular space $C^3$. Thus by means of the rotation of the shaft D in response to the movement of the handle D' the locking mechanism may be thrown into or out of operative connection with the driving parts. So long as there is any tendency for one wheel to slip, the pressure upon the pinions on the shaft C' varies, and the pressure is sufficient to hold the parts in the operative position so that each of the pinions $C^4$ and $C^5$ meshes with one of the master gears. As soon, however, as the tendency to slip disappears there is practically no pressure exerted in the pinions of the shaft C'. The shaft is then merely idling and the pressure upon it is not sufficient to hold it in position in opposition to the action of the spiral spring $C^6$. Thus as soon as the tendency of one wheel to slip or to move more rapidly than the other disappears the lock is automatically thrown out of operation.

The use and operation of my invention are as follows—

A master gear is provided on each of two stub shafts and a driving connection is provided between the two master gears. This connection is normally out of operation, but is adapted at the will of the operator to be put into operation, so that the speed of rotation of the two master gears becomes the same and relative movement is prevented, and so slipping at the wheels becomes impossible. While it is necessary to positively manipulate the locking device so as to put it into operation, an automatic release is provided so that the locking mechanism is automatically thrown out of operation the moment the tendency of slipping at the wheels ceases.

I claim—

1. In a transmission a plurality of separately mounted driven gears, and means for causing them to rotate in unison at the same speed, said means comprising a rotary shaft having a plurality of pinions fixed upon it, and means for causing each of said pinions to mesh with one of said gears, and automatic means for throwing said pinions out of mesh with said gears when the pressure through said gears is uniform.

2. In a transmission a plurality of separately mounted driven gears, and means for causing them to rotate in unison at the same speed, said means comprising a driven shaft rotating about its own longitudinal axis and having a plurality of pinions fixed upon it, and means for causing each of said pinions to mesh with one of said gears, said means comprising said rotary shaft upon which said pinions are fixed and means for moving it axially to cause said pinions to mesh with said gears.

3. In a transmission a plurality of separately mounted driven gears, and means for causing them to rotate in unison at the same speed said means comprising a rotary shaft having a plurality of pinions fixed upon it, and means for causing each of said pinions to mesh with one of said gears, said means comprising said rotary shaft upon which said pinions are fixed and means for moving them, and automatic means for throwing said pinions out of mesh with said gears when the pressure through said gears is uniform.

4. In a transmission a plurality of separately mounted driven gears, and means for causing them to rotate in unison at the same speed, said means comprising a rotary shaft having a plurality of pinions fixed upon it, and means for causing each of said pinions to mesh with one of said gears, and automatic means for throwing said pinions out of mesh with said gears when the pressure through said gears is uniform, said means comprising a spring.

5. In a transmission a plurality of separately mounted driven gears, and means for causing them to rotate in unison at the same speed, said means comprising a rotary shaft having a plurality of pinions fixed upon it, and means for causing each of said pinions to mesh with one of said gears, said means comprising said rotary shaft upon which said pinions are fixed and means for moving them, and automatic means for throwing said pinions out of mesh with said gears when the pressure through said gears is uniform, said means comprising a spring.

6. In a transmission mechanism a plurality of stub shafts, a master gear on one end of each of said shafts, a driving member in said transmission adapted to drive said master gears, a shaft associated with said transmission having fixed upon it a plurality of pinions, one of said pinions constantly in mesh with one of said master gears, and means for bringing each of said pinions into mesh with one of said master gears.

7. In a transmission mechanism a plurality of stub shafts, a master gear on one end of each of said shafts, a driving member in said transmission adapted to drive said master gears, a shaft associated with said transmission having fixed upon it a plurality of pinions, one of said pinions constantly in mesh with one of said master gears, and means for bringing each of said pinions into mesh with one of said master gears, and automatic means for throwing said pinions out of mesh with said gears when the pressure through said gears is uniform.

8. In a transmission mechanism a plurality of stub shafts, a master gear on one end of each of said shafts, a driving member in said transmission adapted to drive said master gears, a shaft associated with said transmission having fixed upon it a plurality of pinions, one of said pinions constantly in mesh with one of said master gears, and means for bringing each of said pinions into mesh with one of said master gears, and automatic means for throwing said pinions out of mesh with said gears when the pressure through said gears is uniform, said means comprising a spring.

9. In a vehicle transmission assembly two stub shafts, means for driving them, said shafts being in line with each other and having each at its outer end a driving wheel and at its inner end a master gear, means for causing said master gears to rotate in unison at the same speed, comprising two pinions fixed upon the shaft, said shaft adapted to be moved so as to bring each of said pinions into mesh with one of said master gears, and a spring bearing upon said shaft adapted to move one of said pinions out of mesh with one of said gears when the pressure transmitted to said master gears is equal.

10. In a vehicle transmission assembly including two separately mounted stub shafts driven from the same source and each carrying a driving wheel and a gear, means for preventing relative slip of said wheels, said means comprising two pinions mounted upon a rotary and adjustable shaft, said shaft adapted to be moved so as to cause each of said pinions to mesh with one of said gears, and automatic means for moving one of said pinions out of mesh with one of said gears when the tendency of the driving wheels to slip has disappeared.

11. In a transmission a plurality of separately mounted driven gears, and means for causing them to rotate in unison at the same speed, said means comprising a rotary shaft having a plurality of pinions fixed upon it, and means for causing each of said pinions to mesh with one of said gears, said means comprising said rotary shaft upon which said pinions are fixed and means for moving them laterally to cause said pinions to mesh with said gears, and automatic means for throwing said pinions out of mesh with said gears when the pressure through said gears is uniform.

Signed at Laporte, county of Laporte, and State of Indiana, this 26th day of February, 1921.

JAMES ROSS.